United States Patent Office 2,818,460
Patented Dec. 31, 1957

2,818,460

PREPARATION OF LIQUID HYDROCARBON DRYING OILS

Edward M. Geiser, Downers Grove, Ill., assignor to Universal Oil Products Company, Des Plaines, Ill., a corporation of Delaware No Drawing. Application September 26, 1955
Serial No. 536,763

12 Claims. (Cl. 260—683.15)

This invention relates to a novel process for the production of relatively high molecular weight unsaturated hydrocarbon oils, and more particularly to a novel process for copolymerizing a mixture of a polyolefin and a mono-iso-olefin in the presence of a dialkylamide solvent.

Synthetic liquid hydrocarbon drying oils capable of producing a coating film having a remarkable degree of hardness, toughness and immunity to deterioration upon continuous exposure to weather conditions of sunlight, high and low temperatures and moisture are prepared by copolymerizing a conjugated polyolefin and a mono-iso-olefin at a relatively low temperature in the presence of a catalyst. The rigid control of temperature during the formation of the copolymer is considered a critical factor in obtaining the desired and preferred liquid product inasmuch as this factor is believed to determine the manner in which the monomers condense to form the copolymer product. The fundamentally different reaction mechanism involved in the formation of insoluble solid polymer production as distinguished from the liquid production here obtained is based upon the fact that copolymerization of the conjugated polyolefin and the mono-iso-olefin at the conditions specified in the present process is believed to proceed linearly by the addition of a monomer at the end of the copolymer chain during the copolymerization reaction; while in the case of the process in which insoluble solid polymers are obtained, a great deal of cross-polymerization is obtained between the copolymers formed in the initial steps of the reaction and the monomer molecules and/or between the initial copolymers. The temperature of the reaction mixture, particularly at the point of polymer formation, is a factor of especially decisive importance in limiting the molecular weight of the product to linear copolymers of intermediate size. The control of this vital factor is effected in the present process by an internal refrigerant which adsorbs a large quantity of heat liberated by the highly exothermic reaction at the point of polymer formation.

An alternative arrangement for externally refrigerating the reaction mixture accompanied by rapid and thorough mixing of the monomer charge stock at the point of introducing the polymerization catalyst may likewise be employed, although the latter is not the generally preferred method of conducting the reaction, due to the much greater difficulty of maintaining the desired low temperatures at the centers of copolymerization within the reaction mixture. This problem is usually associated with the difficulty of maintaining sufficiently thorough mixing to disperse the catalyst and the reactants throughout the entire mass of the reaction mixture and to obtain rapid and efficient heat transfers from the external refrigerant to the centers of the copolymerization whereby cross-polymerization of the resultant formation of insoluble solid polymers as well as conjunct polymerization may be prevented. The internal refrigerant which is utilized in this reaction is preferably a solvent and a diluent for the reaction mixture and therefore will also act in the capacity as a dispersing agent for the conjugated polyolefin and the mono-iso-olefin, thereby further aiding in the control of the reaction temperature by controlling the rate of reaction and hence the rate of liberation of the exothermic heat of copolymerization.

It is, therefore, an object of this invention to provide a controlled reaction for the preparation of liquid hydrocarbon drying oils.

A further object of this invention is to provide a method for controlling the temperature of the copolymerization of a mono-iso-olefin and a conjugated diolefin whereby linear polymerization is effected with a corresponding decrease in the possibility of cross-polymerization with the resultant formation of insoluble solid polymers.

One embodiment of the invention resides in a process for the preparation of a liquid hydrocarbon drying oil which comprises copolymerizing a mixture of a conjugated polyolefin having not more than 8 carbon atoms per molecule and a mono-iso-olefin containing not more than 8 carbon atoms per molecule in a solvent consisting of an N,N-dialkylamide in the presence of a substantially anhydrous hydrogen fluoride catalyst at a temperature in the range of from about 0° to about —80° C., and recovering the resultant polymerized process.

A further embodiment of the invention resides in a process for the preparation of a liquid hydrocarbon drying oil which comprises copolymerizing a mixture containing from about 60 to about 95% by weight of a conjugated diolefin having not more than 8 carbon atoms per molecule and containing a terminal methylene group and from about 5 to about 40% by weight of a mono-iso-olefin containing not more than 8 carbon atoms per molecule in a solvent consisting of an N,N-dialkylamide and in the presence of a substantially anhydrous hydrogen fluoride catalyst at a temperature in the range of from about 0° to about —80° C., and recovering the resultant polymerized product.

A specific embodiment of the invention is found in a process for the preparation of a liquid hydrocarbon drying oil which comprises copolymerizing a mixture of from about 60 to about 95% by weight of butadiene-1,3 and from about 5 to about 40% by weight of isobutylene in a solvent consisting of N,N-dimethylformamide and in the presence of substantially anhydrous hydrogen fluoride at a temperature in the range of from about 0° to about —40° C., and recovering the resultant polymerized product.

Other objects and embodiments of the invention referring to alternative polyolefins and alternative mono-iso-olefins will be found in the following further detailed description of the invention.

As hereinbefore mentioned it has now been discovered that the polymerization reaction between a polyolefin and a mono-iso-olefin is controlled by the use of a solvent comprising an N,N-dialkylamide, said solvent acting as both an internal refrigerant and a diluent for the reaction. Examples of these dialkylamides include N,N-dimethylformamide, N,N-diethylformamide, N,N-dipropylformamide, N,N-dibutylformamide, N,N-dimethylacetamide, N,N-diethyl acetamide, N,N-dipropylacetamide, etc. As previously stated the temperature of the reaction must be maintained in the range of from about 0° to about —80° C. in order to obtain the desired linear polymerization rather than cross-polymerization so that a liquid, unsaturated hydrocarbon oil rather than a resinous or solid cross-polymer is formed. The use of the dialkylamides in this reaction allows said reaction to proceed at a relatively higher temperature than hereinbefore used in similar polymerization processes, that is, temperatures in the range of from about 0° to about —40° C., when using a dialkylamide solvent, will result in the formation of linear polymers of the desired type. In the absence of such a solvent reaction temperatures above −40° C. will allow a significant proportion of the monomers to copolymerize to form the solid insoluble cross polymers which may appear in great degree in admixture with the desired liquid copolymers, or the entire product may be of the solid variety. The tendency to form the solid copolymers increases as the reaction temperature increases, until such point where true copolymerization ceases and undesirable conjunct polymerization begins. In addition, using a solvent of this type the reaction will proceed at higher reaction temperatures thus resulting in a corresponding saving in the cost of refrigerants.

Suitable polyolefinic hydrocarbon reactants containing conjugated unsaturation utilizable in the present process include hydrocarbons of this class which contain not more than about 8 carbon atoms per molecule and preferably contain a terminal methylene group; that is, one of the olefinic bonds in the carbon atom chain of the polyolefin molecule is situated between the carbon atom at the end of the chain and the carbon atom immediately adjacent thereto, the alpha carbon atom. Of the polyolefinic hydrocarbons, the diolefins are more readily available and the least costly of the polyenes; for this reason, the diolefins are generally preferred, although the trienes may also be utilized in the process with substantially similar results insofar as the quality and yield of product are concerned. Typical conjugated diolefins containing not more than about 8 carbon atoms per molecule include such compounds as piperylene, butadiene-1,3, isoprene, hexadiene-1,3, 2-methyl-pentadiene-1,3, 4-methylpentadiene-1,3, 2,3-dimethylbutadiene-1,3 3-methylhexadiene-1,3 and others of homologous and analogous series. Conjugated dienes which do not have terminal methylene groups, such as hexadiene-2,4, or heptadiene-2,4 may also be used, but they react somewhat more sluggishly than the above. Diolefinic hydrocarbons utilizable as charging stock herein may be formed for example by the dehydrogenation of paraffins and/or olefins or by the dehydration of polyhydric alcohols of the corresponding number of carbon atoms. Those dienes having more than about 8 carbon atoms are generally not preferred in the present process because they are lower in reactivity than the smaller molecules and form polymers which dry upon exposure to atmospheric oxygen to form films having a lesser degree of hardness.

The mono-iso-olefinic hydrocarbon reactants utilized in the present process are selected from the class of hydrocarbons containing preferably not more than about 8 carbon atoms per molecule in order to obtain the desired reactivity and to form a product containing the desired properties. The desired unsaturated product would generally not be obtained were higher molecular weight mono-iso-olefins utilized from which copolymers would result having a relatively large proportion of carbon atoms in the chain saturated with hydrogen or alkyl radicals derived from the saturated portion of the mono-iso-olefin molecule charged to the reaction. Although isobutylene (2-methylpropene) is generally preferred as the mono-iso-olefin reactant utilizable in the present process because of its availability and because it is the lowest molecular weight member of the series, other homologous members of the series such as 2-methylbutene-1,3-methylbutene-1, 2-ethylbutene-1, 2,3-dimethylbutene-1, 3-methylhexene-1, etc., may likewise be utilized as the mono-iso-olefin reactant. Although iso-olefins containing terminal methylene groups are preferred, those lacking such groups, such as, for example, 2-methylbutene-2 may also be used under conditions modified to compensate for their somewhat lesser reactivity. Furthermore, mixtures of the mono-iso-olefin and conjugated diolefin reactant may be employed, such as $C_4$—$C_6$ fraction of the products of a thermal cracking reaction employing petroleum as charging stock. Another suitable source of the mono-iso-olefin reactant is an appropriately boiling fraction or selected portion of propylene and butylene polymers or interpolymers, such as a hexene to octene fraction of a codimer gasoline product. Further, it is possible to use, instead of the iso-olefins themselves, the corresponding tert-alkyl-fluorides, which, in a hydrogen fluoride containing system, are equivalent in reactivity to the iso-olefins themselves and may, in a sense, be considered iso-olefin donors.

In addition to controlling the temperature of the reaction another important factor in the preparation of a liquid hydrocarbon drying oil is the proportion of conjugated olefin to mono-iso-olefin in the reaction mixture. The mixture of copolymerizable monomers in the reaction should contain at least 60 percent by weight of the polyolefin and preferably from about 75 to about 90 percent of the combined weight of polyolefin and mono-iso-olefin, depending upon the amount of unsaturation desired in the ultimate product. When utilized in the above specific range of molar proportions the monomers are copolymerized to form liquid hydrocarbons having molecular weights of from about 300 to about 5000, containing from about 10 to about 100 olefinic double bonds per molecule, of which essentially none are conjugated with each other. If the polyolefin to mono-iso-olefin ratio is higher than the range indicated, insoluble solid polymers are formed so that in a sense the addition of the mono-iso-olefins may be said to permit the polymerization of the dienes under these conditions to useful drying oil products. If, a diene to iso-olefin ratio lower than the range cited is used, the resulting product will be obtained in lesser yields and will also have relatively poor drying properties.

The copolymerization of the mono-iso-olefin and polyolefin reactants hereinbefore provided is effected in the presence of a catalyst consisting of substantially anhydrous hydrogen fluoride containing less than about 10% by weight thereof of water. The use of substantially anhydrous hydrogen fluoride as a catalyst in the presence of the copolymerized reaction provides certain advantages in the recovery of the desired copolymer product and in preventing the undesirable deterioration of said product during the recovery operation. Thus, hydrogen fluoride may be recovered for reuse from the catalyst-copolymer complex without deleterious effects upon the hydrocarbon product by an inexpensive and simple method hereinafter described in detail. If Friedel-Crafts methyl halide catalysts such as aluminum chloride, for example, are used in the reaction they must be separated from the reaction products by washing with an active solvent such as alcohol or water. In the case of water the aqueous phase of the hydrolized reaction mixture contains chemically hydrolized or hydrated aluminum chloride which cannot be readily treated to recover the anhydrous catalyst for recycling purposes. If alcohol is used the catalyst is similarly solvated.

The catalyst is introduced gradually into the reaction mixture containing the polyolefin, the mono-iso-olefin and the solvent, preferably in small quantities as the reaction proceeds. If so desired the hydrogen fluoride may be added to the mixture of reactants as a liquid or in gaseous form, the latter being bubbled into the mixture as a suspension or mixture with an inert diluent gas such as nitrogen or gaseous hydrocarbons. The reaction mixture at the point of inlet of the hydrogen fluoride is thoroughly agitated to obtain uniform distribution of the hydrogen fluoride throughout the mixture of the reactants contacted, the total quantity of hydrogen fluoride introduced into the mixture being from about 5% to about 25% of the combined weight of the polyolefin and the mono-iso-olefin reactants. Below about 10% by weight of the reactants the quantity of hydrogen fluoride is generally insufficient to convert, in adequate yield, the monomers charged to the process to copolymers thereof. Above about 25% by weight of the combined monomers the additional quantity of hydrogen fluoride effects no useful purpose in completing or extending the copolymerization reaction.

Following completion of the desired degree of copolymerization after the addition of from about 5% to about 25% by weight of the combined reactants of hydrogen fluoride to the reaction mixture, the hydrocarbon must be separated from the catalyst. The catalyst may be removed from the mixture by the addition of water, aqueous hydrogen fluoride, or aqueous solutions of sodium hydroxide, potassium hydroxide, ammonia, etc., after which the aqueous phase is separated from the copolymer. While such a procedure is often convenient and produces a satisfactory hydrocarbon product, the catalyst is not recovered in condition for reuse, except in the case of aqueous hydrogen fluoride, from which the anhydrous acid may be distilled in part. Other methods of catalyst removal which circumvent this difficulty will be subsequently described in greater detail. Certain oxygen-containing compounds such as alcohols, esters, ethers, phenols, etc., combine with the hydrogen fluoride to form complexes and free the copolymer product. In a similar manner, certain inorganic salts such as sodium fluoride, potassium fluoride, and others combine with hydrogen fluoride to form double salts; anhydrous ammonia and the amines, and alkanol amines, which form amine hydrofluoride salts by reaction with the hydrogen fluoride in the reaction mixture, particularly the high boiling amines such as aniline, pyridine, quinoline, decylamine and their homologs, the hydrogen fluoride salts of which may be heated to recover not only the organic amine for recycle purposes, but the hydrogen fluoride as well in an anhydrous state for recycle to the polymerization stage of the process.

The above materials which combine with hydrogen fluoride and release the copolymer oils therefrom may be designated collectively as "bases," where the term "base" as utilized herein characterizes a class of materials having the general properties of being capable of combining with an acid to form a complex therewith or a neutral salt thereof.

In order to promote the separation between the copolymer product and other components of the reaction mixture, particularly the product formed by reaction of the base with the hydrogen fluoride catalyst, a low boiling naphtha diluent or other mixture of hydrocarbons containing a large percentage of aromatic hydrocarbons such as benzene, toluene, xylene, etc., may be added to the reaction mixture following the addition of the base, the copolymer product dissolving in the naphtha solvent or other aromatic hydrocarbon solvent to form a separate phase which may be decanted from the remaining reaction mixture. In some cases, the separation takes place after the addition of the base without the necessity of adding an additional solvent to effect separation of the product from the remaining components of the reaction mixture.

In accordance with a further alternative method of recovering the hydrogen fluoride catalyst from the copolymerization reaction mixture and simultaneously effecting the recovery of the copolymer product, the reaction mixture obtained upon completion of the copolymerization reaction may be heated or otherwise distilled to vaporize the hydrogen fluoride from the other components of the reaction mixture. The distillation is preferably effected rapidly, for example, by flash distillation of the mixture into a distillation apparatus at normal or sub-atmospheric pressure. Further, this distillation may be carried out more efficiently in the presence of a decomposition catalyst selected from such metals and their alloys as copper, cobalt, nickel, lead, tin, and silver. The hydrogen fluoride may also be flashed therefrom by introducing the copolymerization reaction mixture into a low boiling hydrocarbon naphtha maintained at a temperature of from about 50° to about 150° C. and permitting the hydrogen fluoride to flash distill from the mixture. The copolymer product is thereafter recovered from its solution with the naphtha diluent and/or internal refrigerant by a low temperature distillation procedure which may be effected at sub-atmospheric pressures in order to lower the temperature and thereby prevent deterioration by further polymerization of the copolymer product. The mixture, prior to distillation, may be washed successively with several portions of water or dilute caustic to remove any residual hydrogen fluoride which would adversely affect the product during the distillation.

The copolymer product as recovered in accordance with the above procedure is a light-colored viscous, highly unsaturated hydrocarbon oil containing from about 10 to about 100 nonconjugated olefinic double bonds per molecule and having molecular weights above about 300 to about 5000. It dries rapidly, especially in the presence of metallic driers such as cobalt naphthenate, cobalt oleate and other well-known drier salts, particularly those of lead and manganese, upon exposure in thin films to atmospheric oxygen. The mechanism of the drying reaction in the case of the present copolymer hydrocarbons is believed to be one of polymerization and oxidation as a result of numerous functional unsaturated bonds contained in the structure of the copolymer molecule. When subjected to oxidative drying, a film of the copolymer oil becomes tack-free in less than about 2 hours and dries to a completely non-tacky film to form a film of extreme hardness (having Sward hardness values of from about 45 to about 75) which are also tough, and highly resistant to abrasion. The dried films thereby obtained are moisture and alkali resistant, and do not discolor upon exposure to ultra-violet radiation. The desirable drying characteristics of the copolymer product of this invention renders the same particularly useful in the formulation of protective and decorative coatings such as paints, varnishes, lacquers, etc., as a component in the formulation of printing ink compositions of the oxidative drying type, and its highly unsaturated structure enables it to undergo reaction with sulfur, sulfur halides and thiuram compounds to form factices thereof. Its highly unsaturated structure enables the product to undergo addition and copolymerization reactions with other unsaturated compounds such as unsaturated fatty acid glycerides, alkenyl halides, allyl esters, vinyl esters, vinyl aromatics, acrylates, maleic acid derivatives, and the like, to form resinous or plastic derivative products thereof.

The following examples are given to illustrate the process of this invention which, however, are not intended to limit the generally broad scope of the present invention in strict accordance therewith.

*Example I*

The copolymerization reaction of isobutylene with butadiene was carried out batchwise in a small stainless steel reactor equipped with a mechanical stirrer, a Dry Ice condenser, a thermocouple, and a hydrocarbon and catalyst inlet tube, the reactor being submerged in a Dry Ice-acetone bath. The reactor was cooled to approximately —35° C. and charged with 47.3 g. of dimethylformamide, 83.7 g. of butadiene and 23.9 g. of isobutylene. 32.6 g. of hydrogen fluoride catalyst was added during a 15 minute period while the mixture was vigorously stirred. The mixture was stirred for an additional 2 hours, after which the reactor was allowed to warm to room temperature. The unreacted gases were recovered from the reaction mixture, the reactor was opened and methyl alcohol was added to inactivate the hydrogen fluoride catalyst. The reaction mixture was neutralized with sodium hydroxide and thoroughly washed with distilled water. 46 g. of a dark red, viscous copolymer oil having a bromine number of 30, a molecular weight of 427 and a Gardner color of 17 was recovered. The copolymer oil was spread in a thin film on a glass plate and air dried to give a hard brittle film. This brittle film had a maximum Sward hardness of 45.

*Example II*

A stainless steel reactor similar to the reactor described in Example 1 above was cooled to approximately —40° C. and charged with 80.6 g. of butadiene, 21.1 g. of isobutylene and 23.7 g. of anhydrous dimethylformamide. 33.2 g. of hydrogen fluoride catalyst was slowly added to the mixture with vigorous stirring during a period of approximately 15 minutes. The reaction mixture was continuously stirred for an additional 2 hours meanwhile maintaining the temperature at about −40° C. At the end of this time the reactor was allowed to warm to room temperature, unreacted hydrocarbons were recovered, the reactor opened, the reaction mixture neutralized with sodium hydroxide and washed with distilled water. The total yield of polymer amounted to 61.5% by weight of the hydrogen charge, 54.7% of a reddish orange viscous copolymer oil having a bromine number of 27, a molecular weight of 515 and a Gardner color of 13. A thin film of the copolymer oil was spread on a glass plate, said film air-drying to a clear, brittle film having a maximum Sward hardness of 46.

*Example III*

A stainless steel reactor similarly equipped as in the above experiments was cooled to −40° C. 70.5 g. of butadiene, 24.5 g. of isobutylene and 23.7 g. of dimethyl formamide were charged to the reactor. During a period of approximately 15 minutes 35.2 g. of anhydrous hydrogen fluoride was charged to the reactor with vigorous stirring. The reactor was maintained at a temperature of −40° C. for an additional 2 hours while the reaction mixture was continuously stirred. At the end of this time the reactor was allowed to warm to room temperature, the unreacted hydrocarbon gases were recovered, and the reactor opened. The reaction mixture was neutralized with sodium hydroxide and thoroughly washed with distilled water. The total yield of polymer amounted to 45.3% of hydrocarbon charge with 43% as a light orange viscous oil. The copolymer oil had a bromine number of 25, a molecular weight of 364, and a Gardner color of 10. A thin film of the copolymer oil air dried rapidly to a hard brittle film having a maximum Sward hardness of 60.

I claim as my invention:

1. A process for the preparation of a liquid hydrocarbon drying oil which comprises copolymerizing a mixture of a conjugated polyolefin having not more than 8 carbon atoms per molecule and a mono-iso-olefin containing not more than 8 carbon atoms per molecule in an N,N-dialkylamide solvent in the presence of a substantially anhydrous hydrogen fluoride catalyst at a temperature in the range of from about 0° to about −80° C., and recovering the resultant polymerized product.

2. A process for the preparation of a liquid hydrocarbon drying oil which comprises copolymerizing a mixture of a conjugated polyolefin having not more than 8 carbon atoms per molecule and containing a terminal methylene group and a mono-iso-olefin containing not more than 8 carbon atoms per molecule in an N,N-dialkylamide solvent and in the presence of a substantially anhydrous hydrogen fluoride catalyst at a temperature in the range of from about 0° to about −80° C. and recovering the resultant polymerized product.

3. A process for the preparation of a liquid hydrocarbon drying oil which comprises copolymerizing a mixture containing from about 60 to about 95% by weight of a conjugated diolefin having not more than 8 carbon atoms per molecule and containing a terminal methylene group and from about 5 to about 40% of a mono-iso-olefin containing not more than 8 carbon atoms per molecule in a solvent consisting of an N,N-dialkylamide and in the presence of a substantially anhydrous hydrogen fluoride catalyst at a temperature in the range of from about 0° to about −80° C., and recovering the resultant polymerized product.

4. A process for the preparation of a liquid hydrocarbon drying oil which comprises copolymerizing a mixture containing from about 60 to about 95% by weight of a conjugated diolefin having not more than 8 carbon atoms per molecule and containing a terminal methylene group and from about 5 to about 40% of a mono-iso-olefin containing not more than 8 carbon atoms per molecule in a solvent consisting of an N,N-dialkylamide and in the presence of a substantially anhydrous hydrogen fluoride catalyst at a temperature in the range of from about 0° to about −40° C., and recovering the resultant polymerized product.

5. A process for the preparation of a liquid hydrocarbon drying oil which comprises copolymerizing a mixture of from about 60 to about 95% by weight of butadiene-1,3 and from about 5 to about 40% by weight of a mono-iso-olefin containing not more than 8 carbon atoms per molecule in a solvent consisting of an N,N-dialkylamide and in the presence of a substantially anhydrous hydrogen fluoride catalyst at a temperature in the range of from about 0° to about −40° C., and recovering the resultant polymerized product.

6. A process for the preparation of a liquid hydrocarbon drying oil which comprises copolymerizing a mixture of from about 60 to about 95% by weight of isoprene and from about 5 to about 40% by weight of a mono-iso-olefin containing not more than 8 carbon atoms per molecule in a solvent consisting of an N,N-dialkylamide and in the presence of a substantially anhydrous hydrogen fluoride catalyst at a temperature in the range of from about 0° to about −40° C., and recovering the resultant polymerized product.

7. A process for the preparation of a liquid hydrocarbon drying oil which comprises copolymerizing a mixture of from about 60 to about 95% by weight of butadiene-1,3 and from about 5 to about 40% by weight of isobutylene in a solvent consisting of an N,N-dialkylamide and in the presence of a substantially anhydrous hydrogen fluoride catalyst at a temperature in the range of from about 0° to about −40° C., and recovering the resultant polymerized product.

8. A process for the preparation of a liquid hydrocarbon drying oil which comprises copolymerizing a mixture of from about 60 to about 95% by weight of butadiene-1,3 and from about 5 to about 40% by weight of isobutylene in a solvent consisting of N,N-dimethylformamide and in the presence of a substantially anhydrous hydrogen fluoride catalyst at a temperature in the range of from about 0° to about −40° C., and recovering the resultant polymerized product.

9. A process for the preparation of a liquid hydrocarbon drying oil which comprises copolymerizing a mixture of from about 60 to about 95% by weight of butadiene-1,3 and from about 5 to about 40% by weight of isobutylene in a solvent consisting of N,N-diethylformamide and in the presence of a substantially anhydrous hydrogen fluoride catalyst at a temperature in the range of from about 0° to about −40° C., and recovering the resultant polymerized product.

10. A process for the preparation of a liquid hydrocarbon drying oil which comprises copolymerizing a mixture containing from about 60 to about 95% by weight of butadiene-1,3 and from about 5 to about 40% by weight of isobutylene in a solvent consisting of N,N-dimethylformamide and in the presence of a substantially anhydrous hydrogen fluoride catalyst which is present in an amount of from about 5% to about 25% of the combined weight of said butadiene and said isobutylene at a temperature in the range of from about 0° to about −40° C., and recovering the resultant polymerized product.

11. A process for the preparation of a liquid hydrocarbon drying oil which comprises copolymerizing a mixture of from about 60 to about 95% by weight of butadiene-1,3 and from about 5 to about 40% by weight of isobutylene in a solvent consisting of N,N-diethylformamide and in the presence of a substantially anhydrous hydrogen fluoride catalyst present in an amount of from about 5% to about 25% by weight of the combined weight of said butadiene and said isobutylene at a temperature in the range of from about 0° to about −40° C., and recovering the resultant polymerized product.

12. A process for the preparation of a liquid hydrocarbon drying oil which comprises copolymerizing a mixture containing from about 60 to about 95% by weight of butadiene-1,3 and from about 5 to about 40% by weight of isobutylene in a solvent consisting of N,N-dimethylacetamide and in the presence of a substantially anhydrous hydrogen fluoride catalyst which is present in an amount of from about 5% to about 25% of the combined weight of said butadiene and said isobutylene at a temperature in the range of from about 0° to about −40° C., and recovering the resultant copolymerized drying oil.

References Cited in the file of this patent

UNITED STATES PATENTS

| | | |
|---|---|---|
| 2,645,649 | Hoffman | July 14, 1953 |
| 2,732,358 | Jones | Jan. 24, 1956 |